Sept. 1, 1970  H. FUHR  3,526,142
GYRO BEARING CONSTRUCTION
Filed Oct. 31, 1967
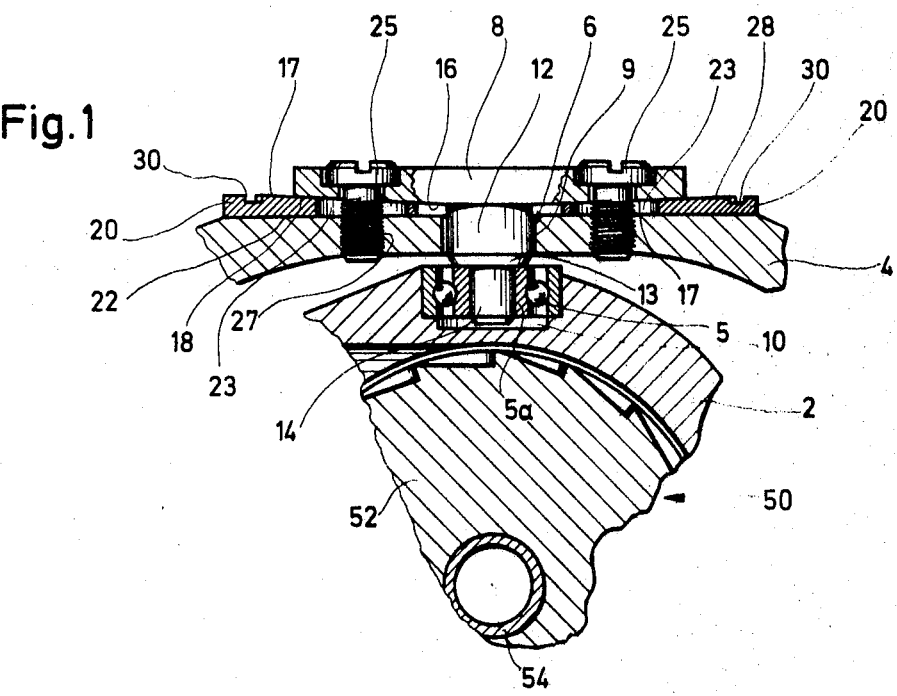
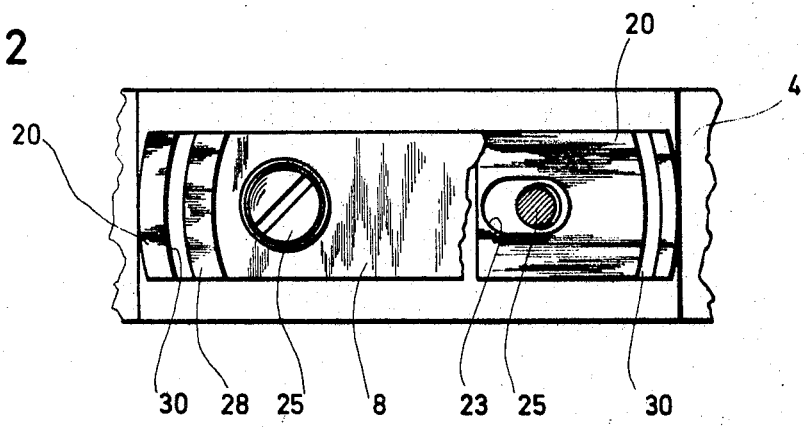
INVENTOR
Herbert Fuhr
By
ATTORNEYS United States Patent Office 3,526,142
Patented Sept. 1, 1970

3,526,142
GYRO BEARING CONSTRUCTION
Herbert Fuhr, Munich, Germany, assignor to Bolkow Gesellschaft mit beschrankter Haftung, Ottobrunn, near Munich, Germany
Filed Oct. 31, 1967, Ser. No. 679,441
Claims priority, application Germany, Nov. 12, 1966, B 68,547
Int. Cl. G01c 19/16
U.S. Cl. 74—5                                    5 Claims

ABSTRACT OF THE DISCLOSURE

A mounting for bearings particularly for the support bearings for a gimbal of a gyroscope includes a carrier plate having a journal or pivot axle projecting from one side which is adapted to be secured to a frame or supporting structure. The supporting structure includes a suitable opening for the journal and the plate is secured to the supporting structure over oppositely arranged wedge members in the form of rectangular plates having enlarged slots through which securing bolts for the plate extend. Both the wedge members and the plate are formed with wedging surfaces or bevels on adjacent contacting surfaces. One or more of the wedge plates may be shifted in order to shift the plate in a direction toward or away from the associated supporting structure or plane.

SUMMARY OF THE INVENTION

This invention relates, in general, to the construction of gyroscopes and, in particular, to a new and useful adjustable bearing for facilitating the centering of a gyroscope supporting gimbal.

It is known to provide means for adjusting bearing pivot members or journals using truncated cone members which may be shifted in order to provide for a shifting of the centering of a bearing or pivot axle. The adjustment for such devices must be carried out by shifting the cones in an axial direction. A disadvantage of such a construction is that it can only be utilized when there is sufficient side space on each side of the device to permit the axial shifting of the cone members. Such a construction would not be suitable, for example, where space is limited, such as in the mounting of a gyroscope within a housing inside of a cardan frame.

The present invention is an improvement over the prior art inasmuch as it provides a bearing which may be adjustable even though the lateral space on the side of the mounting of the unit is limited. In addition, the device may be employed with roller bearings and not only with sliding bearings. The present invention provides a small bearing mounting arrangement which permits adjustment of the bearing journal with high precision and is suitable for the suspension of a gyroscope on the cardan frame.

In a preferred embodiment of the invention there is provided a carrier plate having a journal or axle portion projecting from one side thereof which is adapted to fit through a suitable opening of a mounting frame and fitted into the inner race of a rotatable ball bearing, the outer race of which is carried by a gimbal of a cardan frame. The construction includes a pair of wedge members disposed between the carrier plate and the frame which are slotted to permit passage of the securing bolts which extend through the plate and are threaded into the frame. The slot is of a size to permit shifting of the wedge members so that the inclined wedging face which is engaged with a similar wedging face on the underside of the plate may be shifted to vary the spacing of the plate in respect to the frame and hence the lateral position of the journal member carried by the plate. The wedges are advantageously adjusted by means of a setting tool which engages in a spiral groove defined on the wedge members on a surface portion which extends outwardly from the associated carrier plate. Shifting of the wedges makes it possible to achieve an accurate adjustment of the bearing play regulation and the setting of the cardan frames of the gyroscope relative to the center of gravity of the gyrorotor. The adjustable wedge-shaped parts interengage to provide a form blocking and force locking connection which will withstand high acceleration and shock loads which can occur, for example, when the gyroscopes are used in missiles.

Accordingly, it is an object of the invention to provide a mounting for a journal or bearing which includes flat plate elements which permits the shifting of the bearing.

A further object of the invention is to provide a bearnig particularly for mounting the cardan frames of a gyroscope which includes a carrier plate carrying the journal axle which is adapted to extend through an opening in a frame, the plate being secured to the frame by securing bolts which extend through slots in wedge-members disposed between the plate and the frame, and wherein the wedge members are shiftable in order to provide an adjustment of the position of the bearing.

A further object of the invention is to provide a bearing supporting device which is adjustable and which is simple in design, rugged in construction and economical to manufacture.

The various features of novelty which characterize the invention and pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is an enlarged partial transverse sectional view of an adjustable bearing mounting for a gyroscope constructed in accordance with the invention; and FIG. 2 is a partial top plan view, partly broken away, of the device indicated in FIG. 1.

GENERAL DESCRIPTION OF THE PREFERRED EMBODIMENT

Referred to the drawings, in particular, the invention embodied therein includes a gyroscope mounting generally designated 50 including a gyroscope rotor 52 which is rotatable on an axis 54 within a cardan frame mounting comprising an outer frame 4 and an inner frame 2. The inner frame 2 is provided with a recess 10 in which is positioned a ball bearing generally designated 5 having an inner race 5a which engages an outer portion or axle 14 of a journal or axle generally designated 6.

In accordance with the invention, the journal 6 is carried on an inner face 16 of a plate or carrier plate 8. The journal 6 also includes an intermediate or inner cylindrical portion 12 which extends through an opening 9 in the frame plate 4. Between each end of the carrier plate 8 and the frame 4 there are positioned one-sided wedge plates 20, 20 which have slots 23 which permit the passage of securing bolts 25 which are threaded into the frame 4. The lower side 16 of the carrier plate 8 facing the outer frame 4 is bevelled in a direction toward both sides from the central journal 6 so that wedge surfaces 17 of low inclination result. Corresponding wedge surfaces 18 of the two one-sided wedges 20 engage against the wedge surfaces 17, 17. The opposite surfaces 22 of the wedges 20 bear against the outer flat surface of the cardan frame 4.

Each wedge plate 20 carries a spiral groove 30 which may be engaged by a setting tool (not shown) to shift the wedges 20 after the threaded bolts 25 are loosened. By shifting the wedges, the central journal 6 can be shifted in an axial direction. Naturally, the frame 4 carries on its opposite side a similar arrangement for shifting the other pivot element for the gimbal 2. The construction makes it possible to provide an exact setting for the gimbal frame 2 and the gyro 50 in a surprisingly simple manner so that the rotor 52 may be precisely positioned. By such a construction, the manufacturing and assembly tolerances can be eliminated and the geometric axis and the centroidal axis of the gyroscope may be aligned in a simple and reliable manner.

While a specific embodiment of the invention has been shown and described in detail to illustrate the application of the inventive principles, it will be understood that the invention may be embodied otherwise without departing from such principles.

What is claimed is:

1. An adjustable bearing construction comprising, a mounting frame having a journal opening therethrough, a carrier plate having an underface with an inclined surface adjacent each end and a journal extending outwardly therefrom into the opening of said mounting frame, first and second wedge plates disposed between said carrier plate and said frame adjacent each end of said carrier plate, each having a slot therein and each having an inclined surface in engagement with the inclined surfaces adjacent the respective end of said carrier plate, and a securing bolt extending through said carrier plate and a respective slot of each of said first and second wedge plates and threaded into said mounting frame, the slots being of a width such that said wedge plates may be shifted to shift said journal in an axial direction.

2. An adjustable bearing construction, according to claim 1, wherein said first and second wedge plates include a spiral groove formed therein which may be engaged for setting said plate in respect to said carrier plate.

3. An adjustable bearing construction, according to claim 1, wherein said journal includes an inner cylindrical portion adjacent said carrier plate and an outer cylindrical axle portion of smaller diameter than said inner cylindrical portion, a gimbal having a ball bearing with an inner race engaged on said outer cylindrical portion of said journal and bearing against said inner cylindrical portion.

4. A gyroscope mounting comprising a gyroscope rotor, an inner gimbal surrounding said rotor having a roller bearing with an inner race rotatable on balls within an outer race, an outer frame having a journal opening therethrough, a carrier plate having a journal extending outwardly from one side thereof and extending through the opening of said frame and engaged in the inner race of said roller bearing, and flat wedge plate means disposed between said carrier plate and said frame for shifting said carrier plate in respect to said plate and for shifting said journal axially and including a wedging surface defined between said carrier plate and said wedge plate means, a securing bolt extending through said carrier plate and engaged with said outer frame, said flat wedge plate means having a slot through which said bolt extends permitting shifting of said wedge plate means relative to said carrier plate and when said bolt is loosened to vary the position of said carrier plates in respect to said roller bearing.

5. A gyroscope mounting comprising a gyroscope rotor, an inner gimbal surrounding said rotor having a roller bearing with an inner race rotatable on balls within an outer race, an outer frame having a journal opening therethrough, a carrier plate having a journal extending outwardly from one side thereof and extending through the opening of said frame and engaged in the inner race of said roller bearing, and flat wedge plate means disposed between said carrier plate and said frame for shifting said carrier plate in respect to said plate and for shifting said journal axially including first and second substantially rectangular plate members disposed on each side of said journal between said carrier plate and said frame, said wedge plate members each having a laterally elongated slot therein, and a securing bolt extending through said carrier plate and through an associated slot of said wedge plates and threaded into said frame.

References Cited
UNITED STATES PATENTS

| | | | |
|---|---|---|---|
| 560,775 | 5/1896 | Byrd | 308—31 |
| 1,729,734 | 10/1929 | Carter | 74—5 |
| 2,584,472 | 2/1952 | Konet | 74—5 |
| 2,727,796 | 12/1955 | Sardou | 74—5 XR |
| 2,891,825 | 6/1959 | Barrett | 308—32 |
| 2,984,113 | 5/1961 | Ransom | 74—5 |

ROBERT A. O'LEARY, Primary Examiner

M. A. ANTONAKAS, Assistant Examiner

U.S. Cl. X.R.

308—31